Nov. 1, 1960 SABURO AKAI 2,958,736

ADJUSTABLE MAGNETIC ERASING HEAD

Filed Oct. 20, 1958

INVENTOR.
SABURO AKAI
BY Lyon & Lyon
ATTORNEYS

United States Patent Office 2,958,736

Patented Nov. 1, 1960

2,958,736

ADJUSTABLE MAGNETIC ERASING HEAD

Saburo Akai, Ohta-ku, Tokyo, Japan, assignor to Roberts Electronics, Inc., Los Angeles, Calif., a corporation of California Filed Oct. 20, 1958, Ser. No. 768,231

2 Claims. (Cl. 179—100.2)

Ordinary magnetic tapes for use in tape recording machines come in a standard size and it has been found desirable to record on various portions of this tape without erasing any previous recording on another portion of the tape.

Presently, in a recording head an erasure head precedes the recording mechanism when the tape is drawn through the recording head. This erasing mechanism removes any recording on the tape prior to being subjected to the recording mechanism. As the erasing mechanism covers the full tape, it would erase all recordings on the tape.

It is therefore an object of my invention to provide an adjustable erasure mechanism which can be set to erase only the portion of the tape upon which it is desired to record.

By using a double recording mechanism which is substantially half the width of the tape and adjusting the erasure head, one half of the tape can be recorded at one time and then the tape turned over and the other half of the tape recorded. Or, if desired, the two halves of the recording mechanism can be used at the same time to record the full width of the tape by adjusting the erasure head to cover the full tape, thus permitting the recording of stereophonic sound upon the tape.

Another advantage of my invention is that a double recording mechanism can be used which records only on the quarters of the tape. The first and third quarters from the top for example are recorded with the erasure head set to cover the two portions of the tape. Then the tape is turned over and recording of the second and fourth quarters can be made, thus permitting the tape to be used for twice as much recording and still secure stereophonic recording.

If ordinary recordings are desired, one of the recording instruments is, for example, that in the third quarter, is shut off and only the top quarter is recorded upon. In this position the erase head is adjusted to shut off the lower erase head so that only a recording on one quarter of the tape is permitted. Then the top quarter erasure and recording instrument will shut off and the third quarter is turned on, permitting a recording on the third quarter of the tape. The tape is then turned over for similarly recording on the second and fourth quarters, thus permitting four times the length of recording on one tape as is now possible.

Other objects and advantages of this invention will be readily apparent from the following detailed description of the preferred embodiment thereof.

Figures 1, 2, 3, 4, 5:
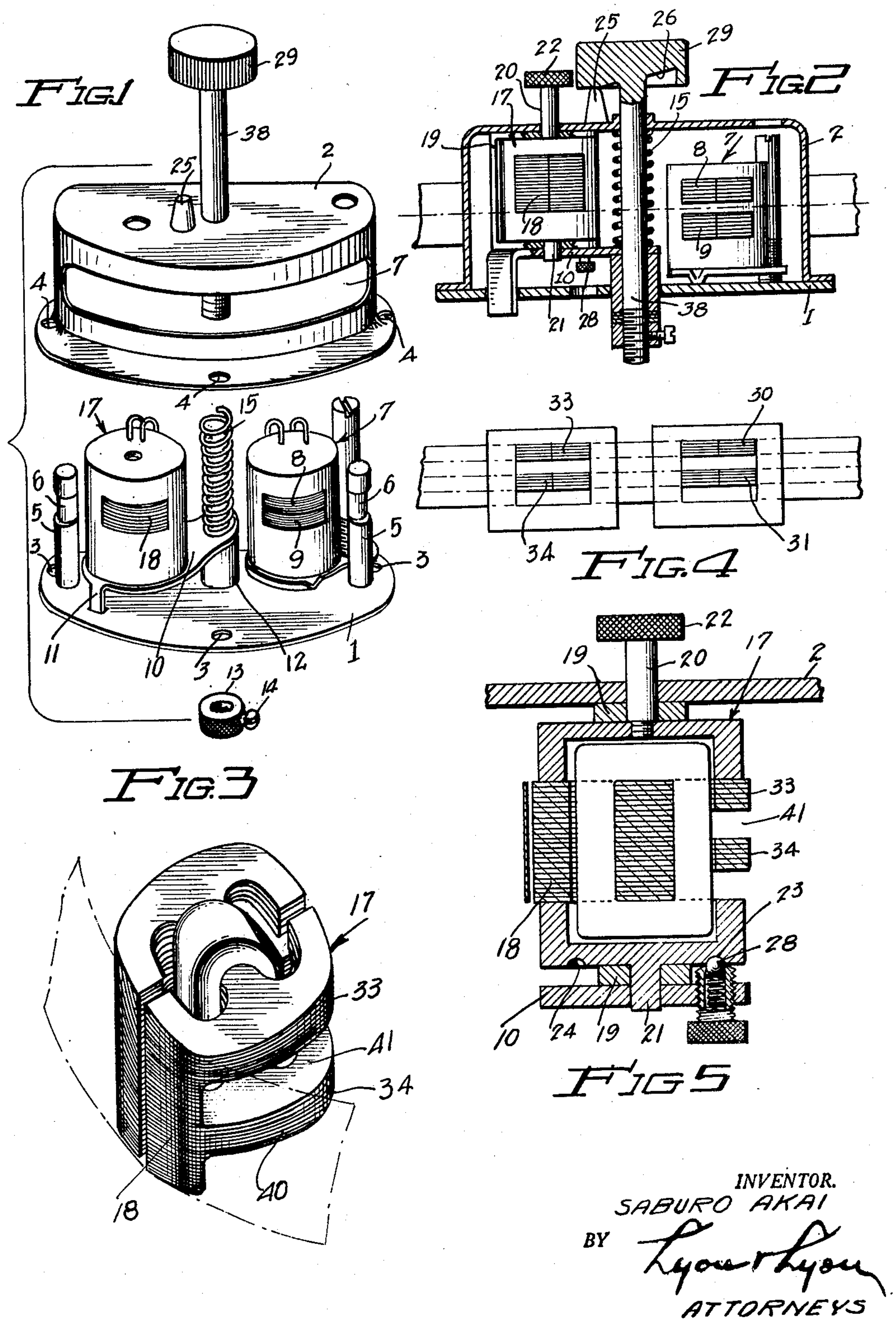
Figure 1 is an exploded perspective.
Figure 2 is a vertical section.
Figure 3 is a perspective of a detail.
Figure 4 is a diagrammatic view.
Figure 5 is a vertical section of the erasing mechanism.

A recording head constructed in accordance with my invention comprises a base plate 1, which has an outer housing 2 bolted thereon by means of bolts passing through the bolt holes 3 in the base plate 1 and holes 4 in the housing 2.

Positioned upon the base plate 1 are the guides 5 which have the slots 6 through which the magnetic tape is fed. A window aperture 7 in the housing 2 permits the tape to be positioned across slots 6 in the guide posts 5. An ordinary recording device 7 is mounted upon the base plate 1 and has two recording sections 8 and 9, one above the other, each of which is approximately half of the size of the magnetic tape to be exposed thereto. The magnetic tape is substantially the same width as the combined total of the heads 8 and 9 and the width of the slots 6.

Rotatably journaled in the base plate 1 and the housing 2 is a shaft 38 which has a hand knob 29 at its upper end. A bracket 10 is slidably positioned upon the shaft 38 and extends horizontally therefrom and has a downwardly extending flange 11 which slidably fits through a slot 12 in the base plate 1. The flange 11 maintains the bracket 10 in a fixed position so that it cannot rotate upon the shaft 38 but permits vertical motion. A sleeve 12 is positioned on the shaft 38 and adjustably held thereon by a collar 13 which has a set screw 14 to secure it to the shaft 38.

A spring 15 positioned between the housing 2 and the top surface of the bracket 10 forces the bracket 10 into contact with the top edge of the sleeve 12. Upon the bracket 10 is mounted an erasing mechanism generally indicated at 17. The erasure head operating face 18 is substantially the entire width of the magnetic tape and the same width as the recording heads 8 and 9. The erasing mechanism is mounted on the bracket 10 by means of a clevis type bracket 19 which is attached to the erasure head 17. The bracket 19 is rotatably journaled by the stubs 20 and 21 to the bracket 10 and the housing 2. A control knob 22 is on the stub 20 to rotate the bracket 19.

A ball and spring 28 and detent 23 in the bracket 10 fixes the erasure mechanism in a positive lock position. A detent 24 on the opposite side of the bracket 19 permits the erasure mechanism to be rotated 180° and locked in position by the ball and spring 28. The purpose of the rotation will be more fully understood from the further description.

A cam rider 25 is incorporated on the outside and top of the housing 2 and is adapted to ride on the cam surface 26 in the hand knob 29. When the hand knob 29 is in one position, such as shown in Figure 2, the cam rider 25 engages the cam 26 and the spring 15 is compressed and the bracket 10 raises into the position shown in Figure 2. In this position only the bottom half of the erasure head 17 is in position to cover the top half of the tape and therefore recording can be made through the recording head 38 on the top half of the tape. Then, when the tape has been turned over a recording is made on the other half.

If, however, it is desired to record on the entire tape at the same time, the hand knob 29 is rotated which allows the cam rider 25 to move on the cam 26 so the spring 15 expands and the bracket 10 moves downwardly on the shaft 38 until the erasure head 18 covers the entire magnetic tape. In this position the erasure head face 18 will erase all recordings upon the tape and if the recording head 9 is now actuated along with the recording head 8, recordings can be made on the entire tape at the same time. By coupling the heads 8 and 9 a single recording on the entire tape can be made. By using two different microphones, one to each head 8 and 9, a stereophonic recording can be made.

In a modification of my invention, recording heads 8 and 9 are replaced with recording heads 30 and 31, which are only one quarter the width of the tape and occupy the first and third quarter of the tape from the top thereof. These can be coupled for single message or jointly used for stereophonic recordings.

By rotating 180° the erasure head 17 by means of the control knob 22 two erasure head faces 33 and 34 are placed in operating position before the tape.

The erasure head faces 33 and 34 are formed in the erasure head 17 by having the laminations 40, which comprise the erasure head, cut away at 41 (see Figure 3) so as to provide a gap between the laminations to form the faces 33 and 34. When these faces 33 and 34 are rotated into operating position, they only cover the first and third quarter from the top of the magnetic tape and thus will only erase in front of the recording heads 30 and 31. Thus, by raising the erasure head 17 by means of the control knob 29, only the face 34 will cover any portion of the tape and will erase ahead of the recording head 30, thus providing that all four quarters can be recorded without previous erasure.

I claim:

1. A recording head for magnetic tape recorders comprising a base plate, a housing mounted upon said base plate, a recording device mounted upon said base plate, a shaft vertically carried by said base plate and slidably thereon, a bracket attached to said shaft, an erase head mounted upon said bracket, a hand knob on the end of said shaft having a cam on its under surface, a cam rider attached to said housing and engaging said cam, a spring engaging said bracket to yieldably hold said shaft in its lowest position and to hold said cam and cam rider in engagement, said erase head being in alignment with said recording device when said shaft is in its lowest position, said cam and cam rider adapted to lift said shaft until only the lower half of said erase head is in alignment with the upper half of said recording device.

2. A recording head for magnetic tape recorders comprising a base plate, a housing mounted upon said base plate, a recording device mounted upon said base plate, a shaft vertically carried by said base plate and slidably thereon, a bracket attached to said shaft, an erase head mounted upon said bracket, a hand knob on the end of said shaft having a cam on its under surface, a cam rider attached to said housing and engaging said cam, a spring engaging said bracket to yieldably hold said shaft in its lowest position and to hold said cam and cam rider in engagement, said erase head being in alignment with said recording device when said shaft is in its lowest position, said cam and cam rider adapted to lift said shaft until only the lower half of said erase head is in alignment with the upper half of said recording device, said erase head having dual spaced erasing faces on one side thereof and a unit erase face on the other side thereof, whereby when said erase head has its unit face aligned it can erase all or half of a tape passing before it or by raising said head one half of said tape and by rotating said erase head into registry with said tape said erase head will erase spaced sections of said tape.

References Cited in the file of this patent

UNITED STATES PATENTS

| | | |
|---|---|---|
| 2,530,584 | Pontius | Nov. 21, 1950 |
| 2,540,406 | Ranger | Feb. 6, 1951 |
| 2,610,257 | Wissmann | Sept. 9, 1952 |